United States Patent [19]

Eastman

[11] Patent Number: 5,210,397
[45] Date of Patent: May 11, 1993

[54] DIFFERENTIATING AND INTEGRATING CIRCUIT FOR TRANSLATING BAR CODE SIGNALS INTO CORRESPONDING PULSES

[75] Inventor: Jay M. Eastman, Pittsford, N.Y.

[73] Assignee: PSC, Inc., Webster, N.Y.

[21] Appl. No.: 832,878

[22] Filed: Feb. 10, 1992

Related U.S. Application Data

[63] Continuation of Ser. No. 518,608, May 3, 1990, abandoned.

[51] Int. Cl.$^5$ .......................... G06K 7/00; H03K 5/153
[52] U.S. Cl. .................................. 235/436; 235/462; 307/358
[58] Field of Search .............. 235/436, 454, 462, 463, 235/466, 474; 307/42, 358

[56] References Cited

U.S. PATENT DOCUMENTS

| | | | |
|---|---|---|---|
| 3,993,894 | 11/1976 | Walker | 235/466 |
| 4,360,798 | 11/1982 | Swartz et al. | 235/463 |
| 4,528,444 | 7/1985 | Hara et al. | 235/462 |
| 4,578,568 | 3/1986 | Tsuzuki | 235/462 |
| 4,680,457 | 7/1987 | Robertson | 235/470 |
| 4,801,788 | 1/1989 | Osaka | 235/462 |
| 4,870,367 | 9/1989 | Nakase et al. | 307/358 |
| 5,142,130 | 8/1992 | Sato | 235/462 |

FOREIGN PATENT DOCUMENTS

| | | | |
|---|---|---|---|
| 62-043209 | 2/1987 | Japan | 307/358 |
| 62-077715 | 4/1987 | Japan | 307/358 |

OTHER PUBLICATIONS

M. M. Cirovic and J. H. Harter, Electronic Devices, Circuits, and Systems, 1987, pp. 366-367.
Cruft Staff, *Electronic Circuits and Tubes*, McGraw Hill, 1947, pp. 830-831.

*Primary Examiner*—Davis L. Willis
*Assistant Examiner*—Edward Sikorski
*Attorney, Agent, or Firm*—Martin Lukacher

[57] ABSTRACT

A system for converting analog bar code signals from the photo detector of a bar code reader or scanner into pulses occurring in time in correspondence with the spacing of the edges of the bars of the code which has a differentiator circuit and a circuit for integrating in time the differentiated signal to produce a second signal lower in amplitude and delayed with respect to the differentiated signal. A comparator compares the differentiated signal and the integrated signal. The output of the comparator is a train of pulses having edges occurring when the differentiated signal and integrated signal are in a certain amplitude relationship (i.e., approximately equal to each other). The peaks of the differentiated bar code signal occur in coincidence with the scanning of the edges of the bar code. The integrated signal is delayed by a fixed time delay. Accordingly, the edges of the pulses are produced by the comparator when the differentiated signals become smaller and become greater than the integrated signal in relative amplitude thereby producing pulses with the same spacing as the edges of the bars of the code and offset slightly in time. Since the differentiated signal is processed to produce the pulses corresponding to the bar code, errors in timing of the pulse edges due to drifting in amplitude of the analog signal and false transitions are substantially obviated.

14 Claims, 3 Drawing Sheets

DIFFERENTIATING AND INTEGRATING CIRCUIT FOR TRANSLATING BAR CODE SIGNALS INTO CORRESPONDING PULSES

This is a continuation, of application Ser. No. 07/518,608, filed May 3, 1990 now abandoned.

The present invention relates to bar code readers or scanners and particularly to systems for use in or with such readers or scanners for translating the analog signals resulting from the reading of the bar code as it is scanned into corresponding pulses.

The invention is useful in bar code readers or scanners of various types in which the bar code is moved relative to the scanner and where the scanner is held stationary and a beam is swept across the code. The illumination from the code is photo detected to produce an analog signal having transitions (changes in relative polarity from a relatively high to a relatively low polarity as the illumination changes due to the black bars and the white spacing therebetween). The invention is applicable for translating such analog signals into a corresponding train of pulses. These pulses contain information as to the symbol represented by the code (usually numbers or letters depending upon the code protocol). One such protocol is the universal product code or UPC which is used on grocery and other products.

In U.S. Pat. No. 4,360,798, a circuit is shown and described in connection with FIGS. 13a to c thereof, for providing a pulse train in response to an analog bar code signal. In order to avoid noise and the effect of ambient light, the bar code signals are AC coupled through a capacitor to one input of a comparator while the other input of the comparator has applied thereto the output of a positive and negative peak detector circuit. The comparator switches when the peak detector circuit output and the analog signal become relatively higher or relatively lower in amplitude. Noise can produce false transitions in the analog signal which are followed by the detector circuit. Thus, the output pulse train from the comparator may likewise have false transitions in the pulse train. A more serious problem results from DC offsets due to ambient light (such as sun light) which is seen by the photo detector. These offsets cause a DC voltage to be added to the analog signal as presented to the comparator and to the peak detector. The analog signals then float or drift in amplitude and the relationship between the peaks thereof and the peaks of the analog signal drift correspondingly. The output pulse train from the comparator then has transitions which are undefined in time and result in pulse trains having timing of pulses which do not correspond identically with the spacing of the bars of the code. A system which is not affected by such DC offsets, processes the analog signal to differentiate the signals twice. The second derivative is used to find the pea of the first derivative and thereby precisely locate the edges of the bars of the code. Complex analog circuitry is then required.

It is the principal object of the present invention to provide an improved system for translating an analog bar code signal into pulses having edges which precisely correspond to the edges of the bars of the code as the code is scanned or read and which does not require complex circuitry such as the double derivative circuitry discussed above.

It is a further object of the present invention to provide an improved system for translating analog bar code signals into corresponding pulses which is less subject to false transitions due to noise and ambient light conditions than translating systems heretofore suggested (sometimes inaccurately called digitizers because the pulse signal contains the information as to the bar code in analog form in accordance with the spacing in time of the edges of the pulses of a pulse train which spacing is an analog function).

Briefly described, a system for translating an analog bar code signal resulting from the scanning of the bars of a bar code having edges spaced from each other, the signal increasing and decreasing in amplitude as the edges of the bars are scanned, makes use of means for differentiating the analog bar code signal to provide a first signal having peak amplitudes of opposite relative polarity which are spaced from each other in accordance with the spacing of the bar edges. The system also has means for integrating the differentiated signal to provide a second signal having peak amplitudes also opposite relative polarity and less than the peak amplitudes of the differentiated bar code signal. The system makes use of the differentiated and integrated bar code signals for generating a train of pulses having edges occurring when the differentiated and integrated signals are one of the opposite relative polarities thereof and also when the integrated and differentiated signals are of the other of their opposite relative polarities. The use of the differentiated bar code signal (the first derivative) enables the bar code edges (which occur during transitions in the analog signal) to be located while excluding the affects of DC offsets due to ambient illumination and the like. The differentiating circuit may be designed to exclude from the differentiated signal false peaks due to high frequency noise. The integrator or delay means is preferably designed to follow both the positive and negative going portions of the differentiated signal and produce an output which follows the differentiated signal but is reduced in amplitude and delayed in time. The relative amplitudes of the differentiated and integrated signals are in predetermined amplitude relationship (e.g. of equal amplitude) at times corresponding to the peaks of the differentiated signal (and therefore to the edges of the bars of the code). A comparator circuit which compares the integrated and differentiated signal then provides means for generating the corresponding pulse train with transitions (pulse edges) having spacing identical to the edges of the bars of the code, but occurring slightly later in time than when the bar edges are scanned.

The foregoing and other objects, features and advantages of the invention, as well as a presently preferred embodiment thereof will become more apparent from a reading of the following description in connection with the accompanying drawings in which.

Figure 2:
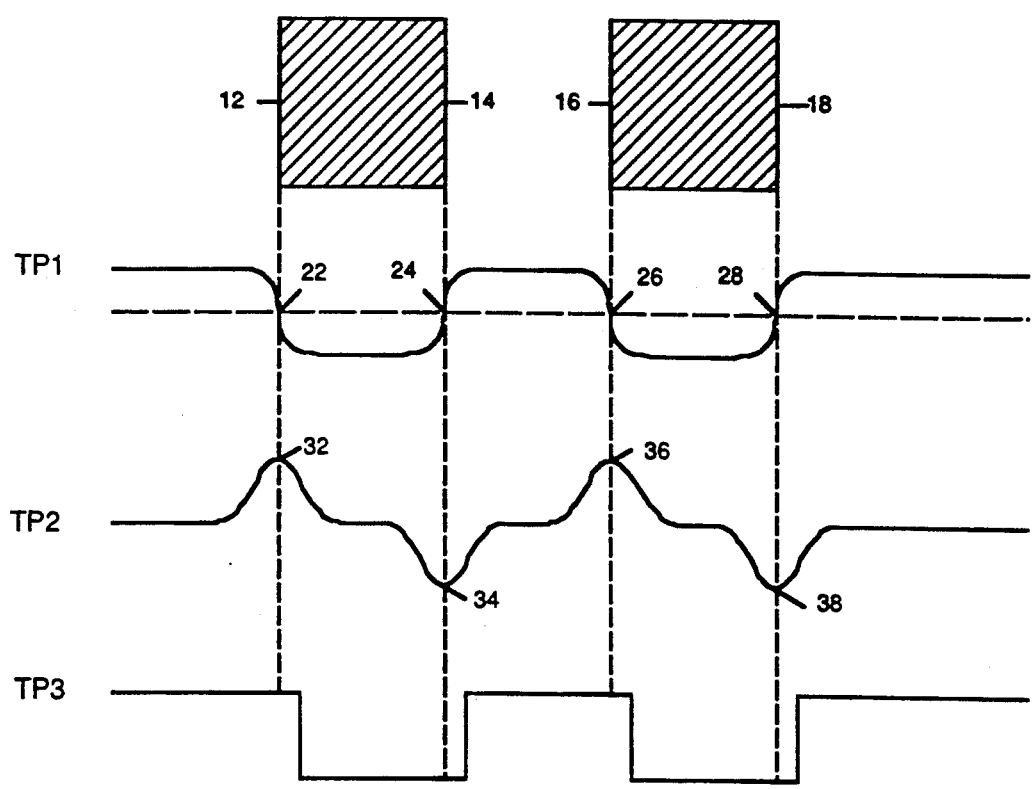
FIG. 2 is a series of wave forms of the optical and electrical signals occurring in the operation of the system shown in FIG. 1.

Referring to the drawings, there is shown the analog electronics of a bar code reader, specifically the photo detector (PD) 10. The photo detector 10 receives illumination from the bars of the code which is low when light is reflected or scattered from the bars and high in intensity when light is reflected from the white region between the bars. Two of the bars of a code are shown in FIG. 2 in terms of the illumination received therefrom by the photo detector 10. The bars have leading edges 12 and 16 and lagging edges 14 and 18. These edges are spaced from each other in accordance with the width of the bars and the spacing therebetween. The symbol represented by the code depends upon this spacing. As the photo detector is effectively scanned across the code (such scanning occurring as a beam sweeps across the code or when a wand containing the photo detector is moved across the code) an electrical signal results which is amplified in an amplifier 20. The output of the amplifier as seen at $TP_1$ changes from a relatively positive amplitude which to a relatively negative amplitude occurs at the crossover points indicated at 22, 24, 26 and 28. The horizontal line through these points, thus, is the base line above which the output is relatively positive and below which the output is relatively negative. $TP_1$ thus represents the analog bar code signal.

Figure 1:
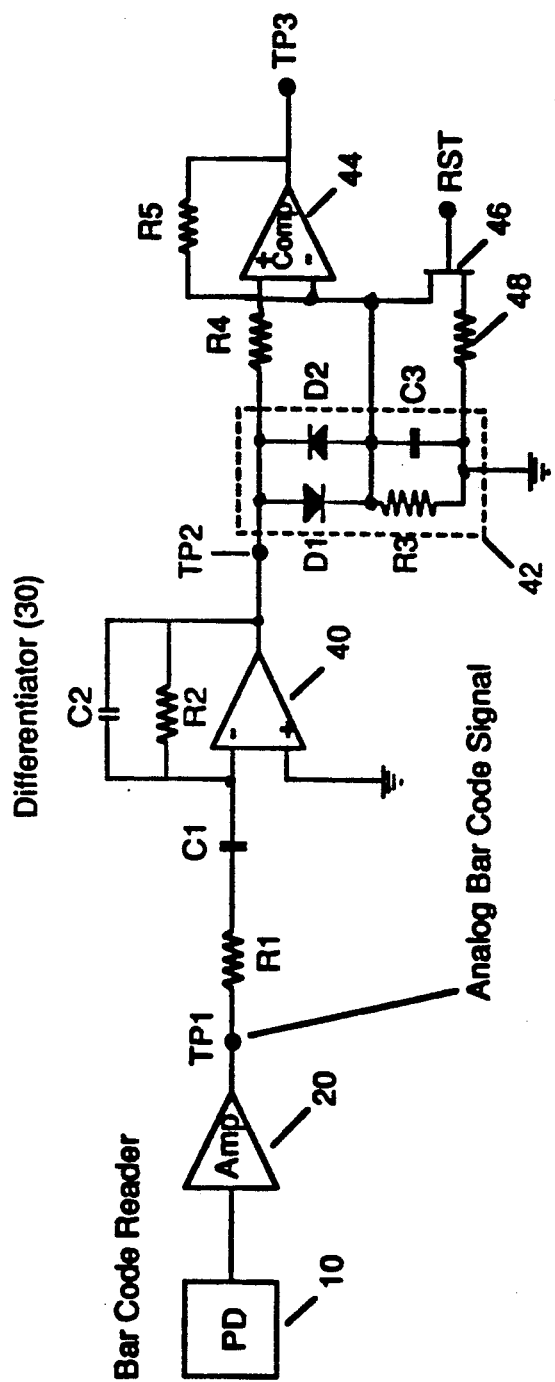
FIG. 1 is a schematic diagram of a system for translating the analog bar code signal from a bar code reader into a corresponding train of pulses.

A differentiator 30 provides a signal indicated at $TP_2$ having peaks of relative opposite amplitude 32 and 34 and 36 and 38 coincident with the crossovers 22, 24 and 26, 28. These peaks are also coincident with the edges 12, 14, 16 and 18 of the bars, as shown in FIG. 1. The differentiator uses a circuit provided by an operational amplifier 40, the noninverting input of which is connected to reference potential (ground). The inverting input is connected through a resistor $R_1$ and capacitor $C_1$ to the output of the amplifier 20. A resistor $R_2$ is connected between the output of the operational amplifier 40 and the inverting input thereof. $C_1$ and $R_2$ define the differentiator and determine the time constant thereof. $R_2$ is shunted by another capacitor $C_2$. $R_1$ and $C_2$ and the amplifier 40 define a low pass filter which blocks the transmission of high frequency noise components in the bar code signal.

The output of the differentiator is applied to an integrating or delay circuit 42 having a storage capacitor $C_3$ shunted by a resistor $R_3$ which principally determines the time constant thereof. This time constant is suitably longer than the differentiator's time constant. Suitable time constants in the differentiator 30 and in the integrating circuit 42 may be 100 microseconds and 25 milliseconds, respectively. The integrating circuit includes two uni-directionally conductive devices (diodes $D_1$ and $D_2$) connected in parallel between the output of the differentiator and the $C_3$, $R_3$ circuit. In other words, the diodes are connected in reverse polarity. The diodes preferably have equal voltage drops due to the equal internal resistance which they present to the signal which is being integrated and delayed. These voltage drops may be of the order of one-half to one volt. The amplitude of the differentiated output signal $TP_2$ may be approximately five volts peak to peak. Because of the voltage drop in the diodes $D_1$ and $D_2$ and the integrating time constant of the $R_3$, $C_3$ circuit, the voltage across $C_3$ is less than and slightly delayed behind the differentiator's output voltage, as shown in FIG. 3 by the dash line curve.

The output pulse train indicated at $TP_3$ is generated by a comparator 44 having noninverting and inverting inputs. The differentiator's output voltage is applied through a resistor $R_4$ to the noninverting input of the comparator, while the voltage across the capacitor $C_3$ of the integrating or delay circuit 42 is applied to the inverting input of the comparator 44. $R_4$ is a trimming resistor which adjusts the magnitude of the output voltage from the differentiator 30 as applied to the comparator 44, so at the voltage on the capacitor $C_3$ differs from the peak voltage by approximately the drop in the diodes $D_1$ and $D_2$. Another resistor $R_5$ is connected between the output and the inverting input of the comparator so as to provide hysteresis so that the comparator does not reset immediately.

Figure 3:
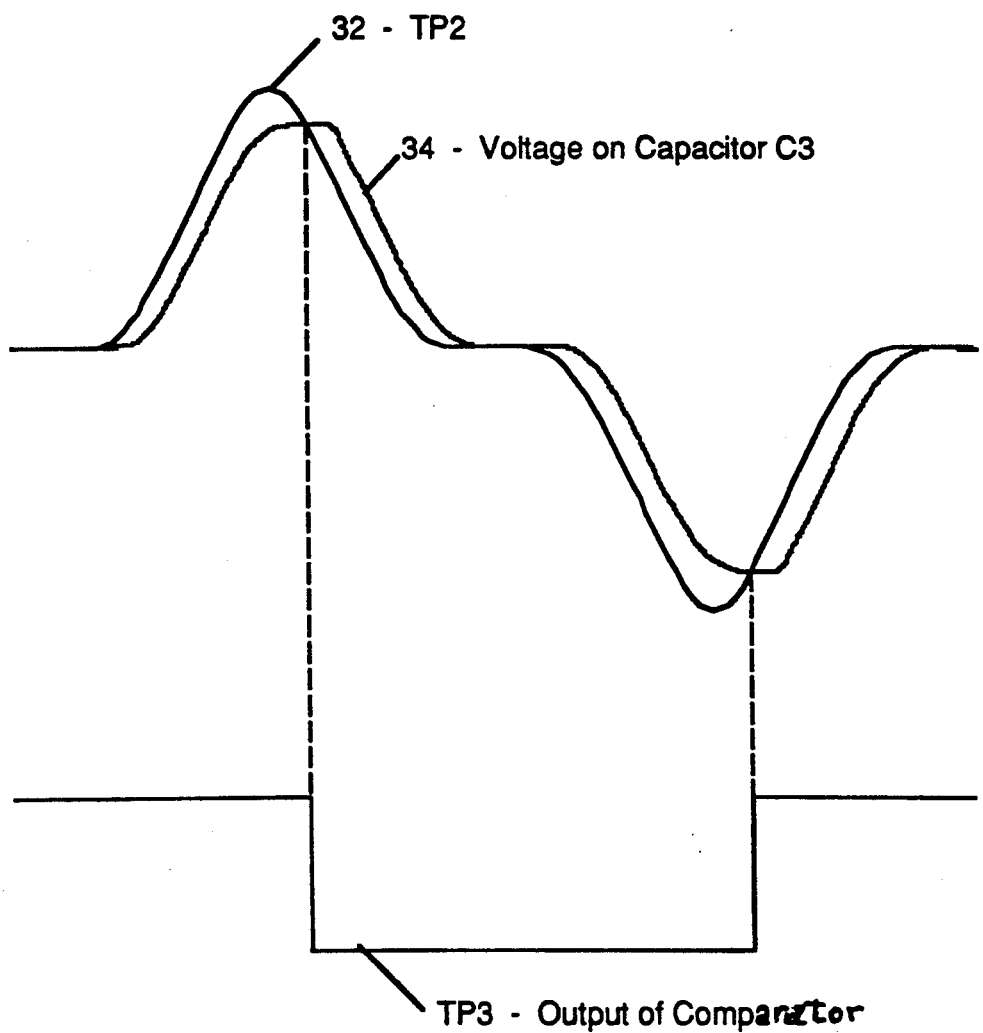
FIG. 3 shows portions of two of the wave forms illustrated in FIG. 2.

It will be observed from FIGS. 2 and 3 that when the relative amplitudes of relatively positive polarity of the voltage on the capacitor $C_3$ and the differentiator output voltage are equal i.e., in a predetermined amplitude relationship, the comparator 44 will switch and provide a negative going edge corresponding to the edge 12 of the bar code but delayed slightly due to the integrating or delaying circuit time constant and the voltage drop across the diode $D_1$. When the voltages are of opposite polarity (and of the predetermined amplitude relationship), the comparator again switches and provides a positive going leading edge. The positive and negative going leading edges are spaced in time identically to the spacing in time of the edges 12 and 14 of the first bar of the code. Similarly, the comparator will switch and provide negative and positive going edges having a spacing identical to the spacing of the edges 16 and 18 of the second bar of the code.

In the event that is desirable to reset the output of the comparator to a level corresponding to the white region between the black bars of the code, the integrating circuit can be discharged by placing a low resistance shunt across the capacitor $C_3$. A field effect transistor 46 and a resistor 48 are used for the this purpose.

From the foregoing description, it will be apparent that there has been provided an improved system for translating analog bar code signals into corresponding pulse trains, which system is not effect ed by ambient light conditions or noise. Variations and modifications in the herein described system, within the scope of the invention, will undoubtedly suggest themselves to those skilled in the art. Accordingly, the foregoing description should be taken as illustrative and not in a limiting sense.

I claim:

1. In a bar code reader which provides an analog bar code signal from the bars of the code which have edges spaced from each other and which increases and decreases in amplitude as the edges of bars of the code are read, a system for translating said signal into pulses having edges spaced from each other in time corresponding to the spacing of the edges of said bars, said system comprising means for differentiating said analog bar code signal having a time constant sufficient to provide a first signal having peak amplitudes of opposite relative polarity spaced from each other in accordance with the spacing of said edges and in alignment in time therewith, means including means for integrating and thereby delaying said first signal for providing a second signal having peak amplitudes also of opposite relative polarity and less than the peak amplitudes of said first signal, and means for generating said pulses so that the edges thereof occur when the said first signal and said second signal each are of the same one of said relative polarities and are in a first amplitude relationship and when said first signal and said second signal each are of the other of said relative polarities and are in a second amplitude relationship.

2. The system according to claim 1 wherein said first and second amplitude relationships are said first and second signals being of equal amplitude, said equal amplitude being equal to the peak amplitude of said second signal.

3. The system according to claim 1 wherein said means for integrating and thereby delaying includes a circuit having a capacitor connected to said differentiating means by unidirectionally conductive devices connected in parallel and in reverse relationship, said first signal being applied to said capacitor through said unidirectionally conductive devices.

4. The system according to claim 3 wherein said circuit has a first time constant, said differentiating means including a differentiating circuit having a second time constant, said second time constant being smaller than said first time constant.

5. The system according to claim 4 wherein a resistor is connected across said capacitor to define said first time constant.

6. The system according to claim 3 wherein said differentiating means comprises a differentiator circuit having an input to which said analog bar code signal is applied and an output providing said first signal, and wherein said unidirectionally conductive devices are first and second unidirectionally conductive devices connected in parallel and in reverse relationship between said output of said differentiator circuit and said capacitor.

7. The system according to claim 6 wherein said devices are diodes having anode and cathode electrodes and connected in oppositely polarized relationship with their respective cathodes and anodes connected to each other.

8. The system according to claim 7 wherein said diodes have approximately the same resistance and drop the amplitude of said first signal as applied to said capacitor by the same amount.

9. The system according to claim 8 further comprising means for discharging said capacitor to reduce the amplitude of said first signal approximately to zero amplitude.

10. The system according to claim 6 wherein said generating means comprises a comparator circuit having first and second inputs to which said first and second signals are respectively applied.

11. The system according to claim 10 wherein said comparator circuit is an operational amplifier having said first and second inputs and an output at which said pulses are provided, and a first resistor connected in feed back relationship between said output and said first input to provide a hysteresis effect.

12. The system according to claim 10 including a second resistor for applying said first signal to said first input of said comparator circuit.

13. The system according to claim 6 wherein said differentiating circuit includes an operational amplifier having first and second inputs and an output, one of said first and second inputs being connected to a point of reference potential, a resistor connected between said output and the other of said first and second inputs, and a capacitor for applying said analog signal to said other input, said resistor and capacitor being operative to differentiate said first signal.

14. The system according to claim 13 further comprising a second capacitor connected in parallel with said resistor, and a second resistor connected in series with aid analog signal applying capacitor, said second resistor and said analog signal applying capacitor defining a low past filter for blocking high frequency noise components of said first signal.

* * * * *